Jan. 1, 1963   B. J. MILLEVILLE   3,071,343
VALVE FOR HIGH PRESSURE ABRASIVE CARRYING FLUIDS
Filed Aug. 18, 1953   3 Sheets-Sheet 1
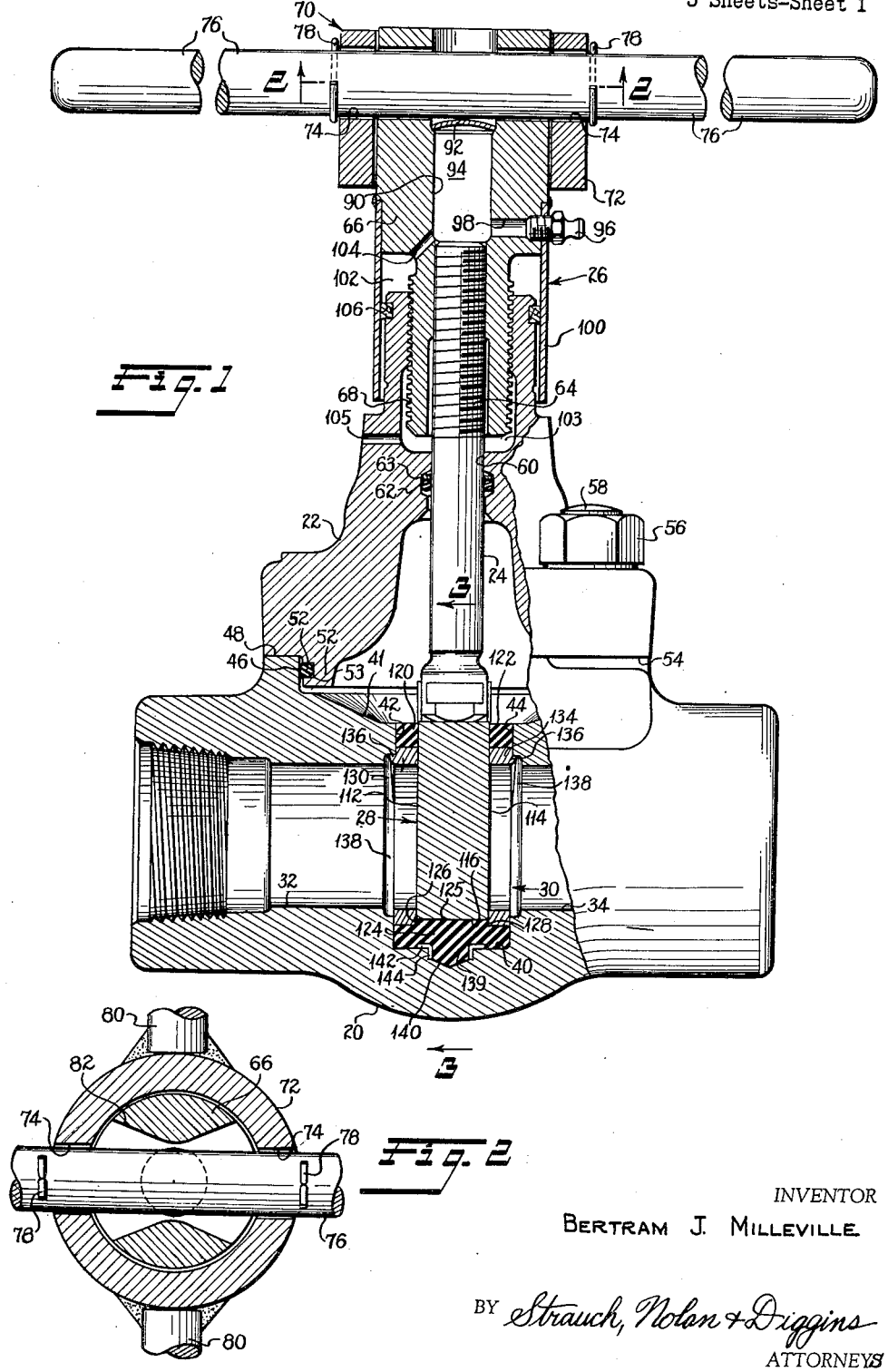
INVENTOR
BERTRAM J. MILLEVILLE
BY Strauch, Nolan & Diggins
ATTORNEYS

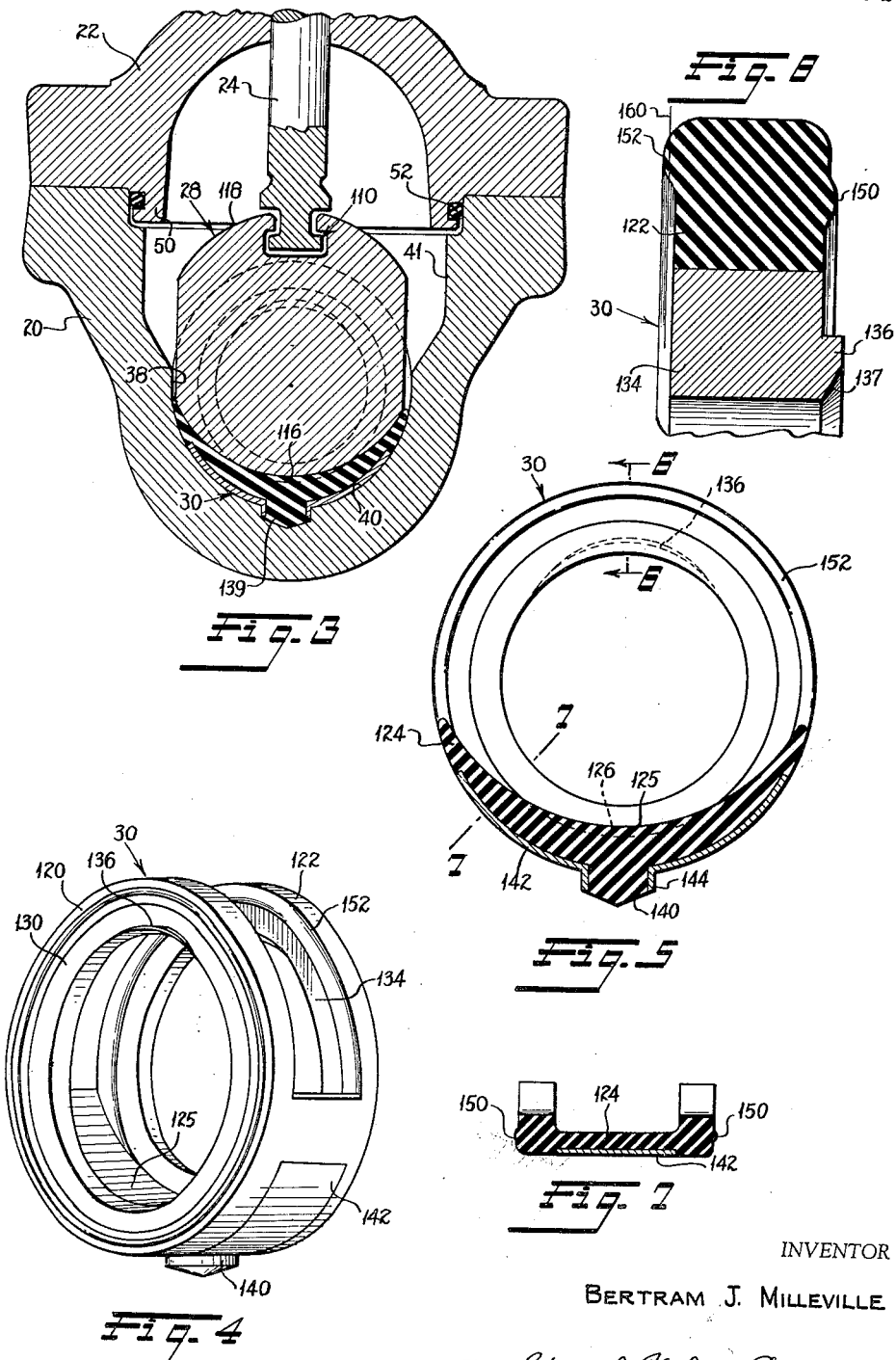

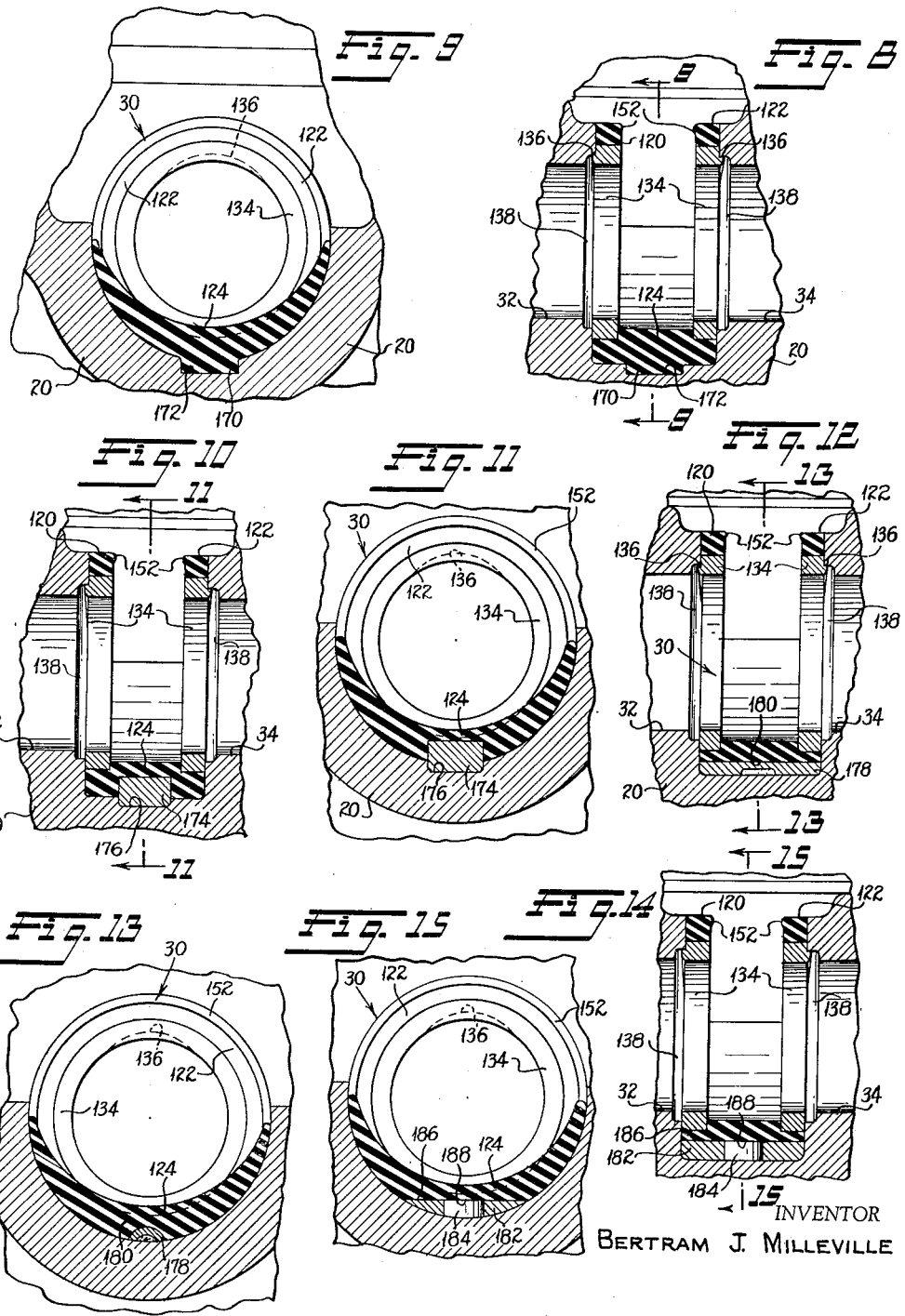

United States Patent Office 3,071,343
Patented Jan. 1, 1963

3,071,343
VALVE FOR HIGH PRESSURE ABRASIVE
CARRYING FLUIDS
Bertram J. Milleville, Homewood, Ill., assignor to Edward Valves, Inc., East Chicago, Ind., a corporation of Delaware
Filed Aug. 18, 1953, Ser. No. 374,909
24 Claims. (Cl. 251—175)

This invention relates to valves and more particularly to gate valves for controlling the flow of abrasive laden fluids.

An unfulfilled need and demand has long existed in the valve art for a commercially practical valve capable of effectively controlling the flow of abrasive laden fluids particularly those which are piped through a conduit system at high pressures. An example of such a system in which the valves of the present invention have particular utility is the mud supply system employed in the drilling of oil wells. In such a system prepared mud is circulated continuously around the drill head and returned to a reservoir after removal of chips and shale. Accumulations of sand and rock fines in the mud soon make it extremely abrasive. Ordinarily the mud is circulated at a pressure of some 1500 pounds per square inch at a temperature which may reach 200° F.

Tests have shown that prior valves of conventional construction installed in a mud line are subject to rapid deterioration particularly in the closed position. The high pressure differential across the valve in the closed position and the presence of abrasive particles, which make the effective sealing of ordinary valves impossible, soon establish small high velocity leaks. Such leaks after very limited service create severe erosion which renders the valve unfit for use. It has been found that once cutting starts it will continue regardless of the materials used in the sealing surfaces of the valve. Abrasion resistant materials such as Stellite which have been effective in ordinary valve applications have been found to be ineffective in preventing erosion of this type. Consequently valves, to be effective in such an environment, must provide an absolutely tight seal in closed position for extended periods of use. Further, experience has shown that since such valves are subject to mishandling and abuse in the field they must be capable of providing the required seal despite poor maintenance and improper operation by unskilled attendants. Thus, insofar as possible, the operation of the valve must be made independent of the quality of maintenance and the skill of the operator.

In addition such valves must be susceptible of easy repair in the field at minimum expense without breaking the piping hook-ups in which they are installed. This condition is especially important where the valves are installed in vertical standpipes having an upper portion which is not independently supported.

It is also essential that the valves be easy to operate despite poor maintenance since it may be expected that if high operating torques are required either initially or after prolonged service the operators may fail to close the valves fully thus permitting a leak which ordinarily remains undetected until the valve is ruined.

The prior art is replete with unsuccessful attempts to provide a valve for mud line and similar service which satisfies the three principal criteria, namely, the provision of an absolutely tight closing seal, ease of field reparability or replacement and ease of operation.

For example, it has been proposed to use abrasion resistant coatings to protect the sealing surfaces of the valve or to use Stellite or other abrasion resistant materials for such surfaces. Such expedients have produced little if any noticeable improvement in valve performance.

The use of lubricated plug valves has also been proposed. Such valves have been fairly successful where maintenance procedures are instituted and rigorously adhered to. However, labor for maintenance is expensive and the usual conditions of abuse and inattention in the field have prevented the wide spread use of such lubricated valves.

In other attempts to solve these long standing problems in the art it has been proposed to utilize a resilient valve seat insert in conjunction with either a rigid or a resilient gate. Examples of such constructions are found in United States Patents 2,194,262, 2,194,263, 2,238,357, 2,510,442 and 2,606,740. While some of these expedients notably the construction of the type shown in Patent 2,194,262 have received some acceptance in the field as the best available none of them represent at best more than a partial solution to the problems noted above, and the demand for an efficient long life mud line and like valve has continued.

One of the principal defects of these prior constructions resides in the fact that the internal fluid pressures act upon the resilient body of the insert in such a manner that portions of the body are forced into the gap between the gate and the adjacent metal parts at the instant the seal is either made or broken. This action causes tearing of the resilient sealing surfaces which thus become incapable of providing the required seal. Further it has been found that the operating torque necessary to fully close many of the prior valves is excessively high so that the valves may accidentally be left in partially open position in which position they are subject to rapid deterioration.

Also when the resilient insert of valves of this type is to be replaced it is necessary to completely disassemble the valve body and to move the flanges which are attached to the mud line conduits apart in an axial direction which necessitates disassembly of the piping hook-up.

Accordingly it is the primary purpose and object of the present invention to provide improved valves for controlling the flow of abrasive fluids which for the first time overcome the foregoing difficulties and provide a tight closed seal, ease of operation with minimum maintenance and reparability in the field at minimum expense.

In accomplishing these and other objects, the present invention contemplates the provision of a wear resistant reinforced resilient seat insert which cooperates with a self-aligning corrosion resistant steel gate to provide a positive seal which is absolutely pressure tight. The resilient action of the sealing surfaces assures a perfect seal despite any hard particles trapped in closing the valve and despite cuts formed on the metallic reinforcing surfaces by the abrasive fluid. More specifically the present invention provides a readily replaceable valve seat insert of composite construction which comprises a resilient sealing structure having spaced coaxial sealing ring portions encircling and permanently bonded to a pair of metallic load bearing reinforcing rings, the ring portions being integral with and interconnected by a bridge having a concave seating surface to be engaged by the bottom of the corrosion resistant gate when the latter is in its closed position. The resilient rubber seat bridges over any abrasive particles trapped beneath the steel gate and insures a tight seal.

In this construction the steel reinforcing rings carry the loads imposed by the line pressure and the resilient portions of the insert provide the entire sealing action and are subjected only to loading forces which create and maintain the seal. Provision is made for the novel utilization of the fluid pressure to augment the sealing effectiveness of the valve.

Accordingly it is a further object of the present invention to provide a novel gate valve assembly and a resilient insert or seat member removably mounted in the valve body to receive and coact with a rigid corrosion resistant valve gate to control the flow of abrasive laden fluid, the seat member coacting with the valve body and gate in a novel manner to minimize cutting and erosion and to insure a leak proof closure under any applied pressure.

It is a further object of the present invention to provide an improved gate valve including an inserted seat member having resilient sealing surfaces reinforced by metal load bearing wear rings, the insert having improved sealing characteristics and an extended service life.

It is also an object of the present invention to provide a novel operator for a gate valve which is sealed, which may be positively lubricated, which requires a minimum of applied torque and provides increased operating speeds.

It is an additional object of the present invention to provide an improved valve for the control of abrasive laden fluids which is of simple rugged construction to minimize the cost of manufacture and repair.

It is also an object of the present invention to provide improved gate valves especially adapted for the control of abrasive laden fluids in which the wear is concentrated on a one-piece replaceable insert which has a greatly prolonged service life.

It is also an object of the present invention to provide a novel valve assembly especially adapted for the control of abrasive laden fluids in which the interior of the valve body is arranged to prevent the accumulation of the abrasive particles therein.

It is an additional object of the invention to provide means for accurately positioning and detachably securing a resilient insert seat in a valve body.

It is also an object of the present invention to provide novel replaceable seat inserts for valve bodies, the inserts having resilient sealing portions which are deformed into sealing contact with the valve body and the flow controlling gate.

It is a further object of the present invention to provide improved gate valves for the control of abrasive laden fluids including a resilient valve seat insert, a rigid gate and an improved gate operator to thereby provide an improved valve assembly having increased service life and ease of operation.

It is an additional object of the present invention to provide improved valves including means for permitting quick and easy valve assembly and disassembly without special tools and without disturbing the piping hook-up.

It is a further important object of the present invention to provide novel gate valves for the control of abrasive laden fluids including a novel composite replaceable valve seat insert in which hydraulic loads are carried by rigid metallic elements and the fluid sealing is effected by the resilient portions of the insert.

It is a further object of the present invention to provide novel renewable resilient valve seat inserts which cooperate with the valve body and gate in such a manner that the pressure of the fluid to be controlled affords hydraulic support for the insert and augments the effective sealing pressures.

It is also an object of the present invention to provide a novel valve assembly including a gate and gate operator and a replaceable resilient valve seat insert which cooperate in a novel manner to provide an improved seal.

Additional objects and advantages will become apparent as the description proceeds in connection with the drawings in which:

FIGURE 1 is a vertical section with parts in elevation of the improved valve of the present invention;

FIGURE 2 is a transverse section taken along line 2—2 of FIGURE 1 illustrating a portion of the improved valve operator;

FIGURE 3 is a sectional view taken along lines 3—3 of FIGURE 1 illustrating details of the valve gate and its cooperation with the replaceable resilient valve seat insert of the present invention;

FIGURE 4 is a perspective view of the composite valve seat insert removed from the valve body;

FIGURE 5 is a vertical sectional view of the improved valve seat insert of the present invention removed from the valve body of FIGURE 1;

FIGURES 6 and 7 are sectional views taken along lines 6—6 and 7—7 respectively of FIGURE 5;

FIGURE 8 is a fragmentary vertical sectional view of a modified form of valve seat insert;

FIGURE 9 is a sectional view taken along line 9—9 of FIGURE 8;

FIGURE 10 is a fragmentary sectional view of a further modification of the valve seat insert;

FIGURE 11 is a sectional view taken along line 11—11 of FIGURE 10;

FIGURE 12 is a fragmentary sectional view of a further modification of the valve seat insert;

FIGURE 13 is a sectional view taken along line 13—13 of FIGURE 12;

FIGURE 14 is a sectional view of a further modification of the valve seat insert; and FIGURE 15 is a sectional view taken along line 15—15 of FIGURE 14.

Referring now particularly to FIGURE 1, the principal components of the valve there shown are the body 20, the bonnet 22, the valve stem 24, the valve operator assembly 26, the valve gate 28, and the replaceable valve seat insert 30. The valve body 20 which is preferably of integral construction is formed with coaxial fluid passages 32 and 34 which terminate at their outer ends in threaded sections 36 for connection to a fluid conduit in conventional manner. At their inner ends the passages 32 and 34 communicate with an enlarged valve seat chamber 38 which has a lower semi-cylindrical surface 40 and an upper enlarged section 41 which extends to the top of the valve body. The body 20 is of shallow construction to facilitate inspection and replacement of the insert 30.

The opposed annular end faces 42 and 44 of the valve seat chamber 38 surrounding the flow passages 32 and 34 are parallel and perpendicular to the flow axis and are machined to provide flat smooth seating surfaces for the insert 30 as more fully explained below. The upper portion of the chamber 38 merges into an annular bonnet receiving portion 46 which is surrounded by a flat machined annular flange 48. The bonnet 22 is provided at its lower surface with a pilot flange 50 carrying a rubber O-ring 52 in a recess 53 which is compressed and sealingly engages the inner surface of the bonnet receiving recess 46 in the valve body. The bonnet is rigidly secured to the body by means of four nuts 56 threaded onto the upper ends of tap end studs 58 mounted in the body 20 urging a flat machined flange surface 54 on the bonnet into tight surface contact with the mating flange surface 48 of the body. The flat surfaces 48 and 54 are perpendicular to the axis of the valve stem 24 so that when nuts 56 are drawn tight they locate the valve stem exactly perpendicular to the flow axis through the valve seat chamber 38.

It will be noted that by virtue of this extremely simple construction the valve can be disassembled, that is, the bonnet, stem and gate removed by merely removing four nuts 56 when replacement, inspection or repair of the valve seat becomes necessary. Further since the body is of integral construction the connection between the body and the fluid conduits need not be broken when the bonnet is removed which significantly decreases both the time and expense necessary to effect replacement of the insert 30. It has been found in practice that replacement of the insert may be accomplished in five minutes or less.

The valve stem 24 is slidably received in an aperture 60 in the bonnet in which an O-ring 62 is positioned below a washer 63 and is formed at its upper end with a thread 64 for engagement with mating internal threads on a yoke bushing 66. The novel use of the O-ring 62 produces much less friction than the conventional stem packing and consequently reduces the required operating torque. The bushing 66 has external threads 68 which engage internal threads formed on the upper end of the bonnet 22. The external and internal threads on the yoke bushing are of opposite hand to provide a compound thread arrangement for moving the stem 24 axially of the bonnet upon rotational and axial movement of the yoke bushing 66. When the external and internal threads of the yoke bushing are of the same pitch the stem moves axially at double the rate and distance of axial movement of the yoke bushing during opening and closing of the valve. This compound thread arrangement decreases the number of turns of the yoke bushing necessary to effect full closing or opening of the valve and reduces the tendency of operators to leave the valve in partially open position. This arrangement also eliminates the special support and fastening ordinarily required for the yoke bushing to bonnet bearing. Further, it reduces the relative motion between the yoke bushing and stem, thus decreasing the length of the stem and the number of stem threads.

An impactor handle assembly 70 is provided for manual rotation of the yoke bushing 66 to open and close the valve. The handle assembly includes a hub 72, sleeved over the yoke bushing 66 and having aligned apertures 74 to receive a bar 76 of the handle assembly. The bar 76 is held in place by cotter pins 78. The other bar 80 of the handle assembly is welded to the hub 72 as shown in FIGURE 2. The bar 76 as shown particularly in FIGURE 2 extends through a slot 82 of hourglass form in the yoke bushing 66 to permit limited rotational movement of the handle assembly with respect to the yoke bushing 66 to obtain the desired impactor effect.

The relatively small diameter of the threads on the yoke bushing 66 provides a relatively large mechanical advantage for a handwheel of given diameter which further reduces operating torque.

The outer end of the yoke bushing is bored as at 90 and closed by a friction tight plug 92 to form a lubricant chamber 94 to which lubricant is supplied under pressure through a conventional check valve fitting 96 and a passage 98. A tubular shield 100 is welded or otherwise rigidly secured to the yoke bushing 66 and projects downwardly over the upper end of the bonnet 22 to form therewith an outer lubricant chamber 102. The position of the lower edge of the shield 100 indicates the position of the gate which obviates the necessity for exposing the stem end for this purpose. The chamber 102 receives lubricant from the inner chamber 94 through a passage 104 and is closed at its lower end by an annular seal 106 positioned on the bonnet. Lubricant which passes into space 103 between the bushing 66 and bonnet 22 may escape through exhaust port 105. This construction permits positive lubrication of all of the threads and at the same time protects all of the threads from dirt and abrasive particles by the use of a single seal thus assuring their operation with minimum friction loss and is of simple, rugged and inexpensive construction.

The gate 28 which is of hardened steel with a corrosion resistant plate to protect the gate and reduce friction is of rectangular cross section and provided with smooth opposite parallel flat side faces 112 and 114 and an arcuate lower surface 116. The gate also has an upper arcuate surface 118 formed on the same radius as the lower surface 116 so that the outside contour of the gate may be formed by one simple turning operation on a rectangular block or the gate may be cut from round bar stock. The gate 28 is mounted at the lower end of the stem 24 by means of a T-slot connection 110 to permit limited lateral movement of the gate 28 with respect to the stem 24.

This construction compensates automatically for any minor inaccuracies in the alignment of the stem and gate and prevents the transmission to the stem of lateral forces as the gate is moved by fluid pressure into sealing position. Thus freedom of movement of the stem is assured despite the application of high fluid pressures to the gate within the valve body. Further since the stem and gate are separate parts they may be constructed of different materials selected to suit the separate service requirements of the stem and gate thus decreasing the expense of the assembly.

In its preferred form the composite valve seat insert shown in FIGURES 1 and 3–7 comprises essentially a unitary resilient sealing structure permanently bonded to a pair of rigid metallic wear and reinforcing rings. The resilient sealing structure is preferably made of synthetic rubber having a hardness of approximately 70 durometer. The hardness of the rubber may be increased or decreased to some extent, the upper limit being dictated by molding practice and the lower limit being determined by strength requirements. The resilient structure includes spaced resilient sealing ring portions 120 and 122 having an outer diameter substantially equal to that of the annular faces 42 and 44 formed on the valve seat chamber 38 and an inner diameter substantially greater than the diameter of the flow passages 32 and 34. The ring portions 120 and 122 are connected along their lower portions by a central crescent-shaped bridge section 124 having a lower arcuate surface of the same radius of curvature as the lower surface 40 of the valve seat chamber and an upper arcuate surface 125 formed on substantially the same radius of curvature as the lower surface 116 of the valve gate.

The upper surface 125 of the bridge 124 is disposed below the level of the bottom of passages 32 and 34 and above the level of the inner surface of the lower portion of the cylindrical portions 120 and 122 to form crescent-shaped radial shoulders 126 and 128 therewith. Bonded to the inner cylindrical surface of the resilient ring portions 120 and 122 are identical hardened steel reinforcing rings 130 and 134 which are preferably of substantially the same axial width as the resilient rings so that their flat inner and outer radial faces are substantially flush with the inner and outer faces of the rings, respectively. The inner diameter of the rings 130 and 134 is substantially the same as the diameter of the passages 32 and 34. Thus the rings form a continuation of the flow passages and their lower portions are disposed well above the level of the upper surface 125 of the resilient bridge 124.

The shoulders 126 and 128 are not bonded to the reinforcing rings 130 and 134 so that the bridge 124 may be freely compressed and released as the gate 28 is closed or opened. The reinforcing rings 130 and 134 are provided along the upper portions of their outer surfaces with axially projecting arcuate lips 136 shown on enlarged scale in FIGURE 6 which extend into annular recesses 138 in the valve body. As the seat insert 30 is thrust into the valve chamber the inclined surfaces 137 on lips 136 cam the composite end rings of the insert toward each other and they resiliently spring back to lock lips 136 in recesses 138 after passing faces 42 and 44. The lips 136 thus positively retain the entire seat insert 30 within the valve body at all times when the gate 28 is received in the insert. However, when the valve gate is fully withdrawn from the insert as, for example, when the bonnet is removed, the insert may be readily removed from the valve body by merely squeezing the opposed ring portions together until the lips 136 clear the annular surfaces 42 and 44 in the valve body. Thus while the valve insert is positively retained in the valve body during operation it may be readily removed without special tools for repair and replacement.

The insert is locked against rotational movement within the valve body 20 by means of a boss 139 formed integrally on the lower surface of the bridge portion 124 which extends into a mating recess 140 formed centrally of the lower surface of the seat chamber 38. To provide support for the lower surface of the bridge 124 and the boss 140, a reinforcement shell 142 of metal or other hard material is preferably bonded to the central portion of the bridge 124 and is formed with a central cylindrical portion 144 surrounding the locating boss 140.

An axially projecting annular ridge 150 is formed on the outer surface of each of the sealing ring portions 120 and 122 of the insert substantially midway of the inner and outer cylindrical surfaces of the latter, the ridges being adapted to engage the adjacent surfaces 42 and 44 of the valve body. Annular axially projecting ridges 152 of semi-circular section are formed on the inner opposed surfaces of the rings 120 and 122 adjacent the outer periphery thereof and at their lower ends merge smoothly into the bridge 124. When the insert is in the position shown in FIGURE 1 with the ridges 150 engaging the surfaces 42 and 44 the distance between the inner surfaces of the ridges 152 is slightly less than the width of the gate 28 so that at all times contact will be maintained between the ridges 152 and the adjacent side surfaces of the gate.

In the full open position of the valve the lower edge of the gate 28 is substantially flush with the inner diameter of the reinforcing rings 130 and 134 and thus maintains lips 136 in the outer surface of these rings in engagement with the mating recesses 138 in the valve body. In the absence of fluid pressure the self-aligning gate will be substantially centered between the ring portions 120 and 122. The dimensions of the components of the sealing structures are such that the lateral surfaces of the gate will occupy the approximate position shown by reference line 160 in FIGURE 6 thus compressing the ridges 150 and 152 to establish an initial sealing contact between the gate and the ridges 152 and the valve body and the ridge 150. When fluid under pressure is supplied to the valve and the gate is subjected to the dynamic and static pressures of the fluid flow it moves in a downstream direction because of the sliding T-slot connection 110 until the downstream surface of the gate is in contact with the adjacent surface of the reinforcing ring 134 at which time the ridges 152 and 150 are compressed into full sealing position. When the gate is closed its lower arcuate surface 116 is in full surface contact with the upper surface of the crescent-shaped bridge 124, the latter being compressed into tight sealing contact with the lower surface of the gate. Since the shoulders 126 and 128 of the bridge 124 are not bonded to the adjacent side surfaces of the reinforcing rings 130 and 134, compression of the bridge may take place without risk of tearing the rubber at these points. At any time when fluid pressure is initially applied to one side only of the closed gate, a differential pressure is established between its upstream and downstream sides and also across the ridges 152 on the upstream ring 120. Since the ridge 152 is positioned at the outer periphery of the ring 120 it is substantially unsupported against outward distortion and is free to distort outwardly under a very low differential pressure. In practice it has been found that a differential pressure of 25 pounds across the upstream ridge 152 is sufficient to break the seal at this point and permit the limited fluid flow into the valve chamber above the gate necessary to fill and pressurize this chamber. Because of this deliberately permitted inflow at the upstream side of the gate substantially the full line pressure effectively acts on the outer surface of the downstream ring 122 after a very limited fluid flow past the upstream ring. Since the ridge 152 on the downstream ring 122 is fully compressed by the downstream side of the gate and is supported against inward distortion both by its position on the outer periphery of the downstream ring and by contact with the gate, it is urged into sealing contact with the downstream side of the gate directly by the applied fluid pressure which augments the primary sealing action caused by compression of the resilient ridge by the gate.

It is to be noted that the seal is achieved without full mechanical support of the insert. The operation of many of the prior devices such as that shown in Allen Patent 2,194,262 is dependent upon mechanical confinement of the resilient body which is in turn dependent upon the maintenance of close tolerances between the adjacent portions of the valve body and the resilient insert.

While the ridge 150 augments the seal to some extent the primary purpose of the ridge 150 is to assure the establishment of an initial seal either during closing movement of the valve or during establishment of the initial differential pressure across the gate 28 if fluid pressure is applied when the valve is closed. The establishment of this initial seal is of particular importance in providing a drop-tight closure when upstream pressure is not sufficiently high to cause the gate to move downstream into contact with ring 134. Drop-tight closure at all pressures from zero to maximum effectively minimizes contamination of the mutually contacting surfaces of gate 28 and ring 134 with abrasive particles borne by the fluid.

It is to be particularly noted that the gate is supported against downstream movement by solid metal to metal contact, a solid supporting metal structure being formed by the surface 44 of the valve body and the reinforcing ring 134. The rubber portions of the composite insert thus perform substantially no support function being true sealing members only. The separation of support and sealing functions between the rigid and resilient portions of the composite insert thus permits utilization of each portion with maximum effectiveness.

The construction of the bridge portion of the insert on the gate is such that positive compression is obtained on that portion of the rubber which is expected to be the last to make and the first to break the seal when the valve is closed or opened. This portion of the insert sustains the most severe wear and tear. However, any such wear may be compensated for by increased downward movement of the gate to full closed position because of the direct compression of the rubber in the bridge section. This effect is dependent upon virtually complete confinement of the bridge portion of the insert.

Since the upstream and downstream surfaces 112 and 114 of the gate are parallel the added downward movement of the gate into fully closed position to compensate for any wear which may occur on the bridge portion can be accomplished without effecting the sealing qualities of the remainder of the insert.

As stated above, the upper surface 125 of the bridge portion is disposed below the adjacent cylindrical inner surfaces of the reinforcing rings 130 and 134. In practice, in a valve having flow passages approximately two inches in diameter, the central portion of the bridge will be depressed approximately one-eighth of an inch below the adjacent surfaces of the reinforcing rings. This protects the resilient seating material against the severe throttling condition existing the instant before the gate completely blocks the flow passage 32–34 when the valve is being closed or after it has ceased to completely block the flow passage 32–34 when the valve is being opened. In the interval represented by motion of the gate between a position just completely blocking the flow passage and a position fully seated against the upper surface 125 of the resilient bridge 124, fluid pressure against the surface 125 is substantially uniform and flow across the surface is limited to that resulting from slight leakage between gate 28 and ring 134. Thus, there is no tendency for the resilient material to be forced out of its normal shape and position in either the closing or opening action, as is the case in some prior devices utilizing O ring seals.

The modified inserts shown in FIGURES 8 through 15 are in operation and function identical to the insert described above. The inserts of FIGURES 8 through 15 are also identical in construction with the insert described above with the exception of the means for preventing rotational movement of the insert with respect to the valve body. In the seal of FIGURES 8 and 9 this takes form of an unsupported rubber projection 170 which fits into a flat bottomed mating recess 172 in the valve body. In the construction of FIGURES 10 and 11 the bridge portion of the insert is bonded to a square metallic locking member 174 which fits into a mating recess 176 in the bottom of the valve body. In the modification of FIGURES 12 and 13 a steel key 178 of half round section is welded to the valve body and received within a groove 180 formed in the bridge portion of the insert.

The insert of FIGURES 14 and 15 includes a plate 182 plug welded as at 184 to the valve body and formed with a flat upper surface 186 for engagement with a mating flat surface 188 on the bridge portion of the insert. While all of these constructions are designed to prevent relative rotation between the insert and the valve body during extended periods of service the construction shown in FIGURE 1 is preferred because of superior effectiveness coupled with simplicity and low cost.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A composite valve seat insert for a valve having inlet and outlet flow passages and a flow controlling gate comprising; a pair of spaced parallel resilient sealing rings integrally joined only by a resilient bridge extending around a portion only of a circumference of said rings; means forming sealing surfaces on said rings and said bridge adapted to yieldingly engage said gate; a rigid annular reinforcing member bonded to the inner periphery of each of said rings and adapted to supportingly engage said gate, and a rigid reinforcing member secured to said bridge.

2. A composite valve seat insert for a valve having a central cavity communicating with inlet and outlet passages and a flow controlling gate comprising; a resilient body adapted to fit within said cavity, said body having a bridge and spaced coaxial sealing ring portions integrally connected by said bridge and adapted to surround said inlet and outlet passages respectively and providing sealing surfaces adapted to engage the respective upstream and downstream side surfaces of said gate; rigid annular reinforcing rings received within said sealing ring portions and bonded to the inner periphery thereof, the inner periphery of said reinforcing rings forming a continuation of said inlet and outlet passages, and a rigid reinforcing member secured to said bridge.

3. A composite valve seat insert for a gate valve having inlet and outlet flow passages and a flow controlling gate comprising; a pair of spaced coaxial resilient sealing rings adapted to surround said passages and having surfaces engageable with the opposite sides of said gate; a resilient bridge integrally connecting said rings along a portion only of the circumference of said rings, said bridge having a surface for sealingly engaging the bottom of said gate when the latter is in closed position; a rigid reinforcing ring received within each of said sealing rings and bonded to the inner periphery thereof and a rigid reinforcing shell bonded to the outer surface of said bridge.

4. A valve seat insert for a valve having a central cavity communicating with inlet and outlet flow passages and a flow controlling gate comprising; a one piece resilient body adapted to fit within said cavity, said body having spaced coaxial sealing ring portions adapted to surround said inlet and outlet passages and a bridge joining said ring portions around a portion only of the circumference of said ring portions; sealing surfaces on said sealing ring portions adapted to engage the sides of said gate comprising inwardly facing resilient ridges formed integrally with said ring portions; an upwardly facing surface on said bridge adapted to yieldingly engage the lower edge of said gate; and rigid annular reinforcing members received within each of said ring portions and bonded to the inner periphery thereof, the width of said annular reinforcing members being less than the maximum free width of said ring portions.

5. The insert defined in claim 4 together with means on said reinforcing rings adapted to cooperate with the walls of said cavity for retaining said insert within the cavity.

6. The insert defined in claim 4 together with means on said bridge adapted to cooperate with the walls of said cavity for preventing relative rotary movement of the insert with respect to said cavity.

7. A valve seat insert for a gate valve, comprising; a pair of resilient sealing rings; means forming resilient ridges on each of the radial faces of said rings adapted, respectively, to sealingly engage the sides of the gate and portions of the valve body; a resilient bridge integrally connecting said rings around a portion only of the circumference of said rings and having a surface adapted to yieldingly engage the lower end of said gate and metal reinforcing rings bonded to the inner periphery of each of said resilient sealing rings, the width of said metal reinforcing rings being less than the maximum free width of said sealing rings.

8. A valve seat insert for a gate valve, comprising; a pair of spaced resilient sealing rings; means forming resilient ridges on each of the radial faces of said sealing rings adapted to sealingly engage the sides of the gate and portions of the valve body; a resilient bridge integrally joining said sealing rings around a portion only of the circumference of said sealing rings and having a surface adapted to sealingly engage said gate; rigid metal reinforcing rings bonded to the inner periphery of each of said sealing rings and a rigid reinforcing shell bonded to the outer surface of said bridge.

9. A valve seat insert for a valve having inlet and outlet flow passages and a flow controlling gate comprising; a pair of spaced resilient reinforced sealing rings joined by a resilient bridge; resilient annular sealing ridges formed integrally with said rings on the inner opposed radial faces thereof, said ridges being formed adjacent the outer periphery of said rings whereby said ridges are substantially unsupported against outward deformation by fluid from said inlet passage to permit the limited flow of fluid over the ridge adjacent said inlet passage to the outer surface of the ridge adjacent said outlet passage to augment the sealing pressure between the latter and the body in the area surrounding said outlet passage and metal reinforcing rings bonded to the inner periphery of each of said sealing rings, the width of said metal reinforcing rings being less than the maximum free width of said sealing rings.

10. In a gate valve, a body having a central cavity comunicating with inlet and outlet flow passages; a unitary resilient body fitting within said cavity, said resilient body having a pair of spaced coaxial sealing rings surrounding and in contact with the inner ends of said inlet and outlet passages, respectively; said sealing rings being out of contact with the valve body around a substantial portion of their periphery; metal reinforcing rings bonded to the inner periphery of the respective sealing rings, the width of the reinforcing rings being less than the maximum free width of the sealing rings; a valve stem; means supporting said stem for movement toward and away from said cavity; a valve gate; and means supporting said gate on said stem for lateral movement with respect thereto under the influence of fluid flow from said inlet passage whereby said gate is urged into sealing contact with and deforms the one of said sealing rings surrounding said outlet passage and the downstream movement of said gate being limited by one of said metal reinforcing rings.

11. In a gate valve; a valve body having inlet and outlet flow passages, a replaceable valve seat insert having reinforced resilient sealing rings adapted to surround said inlet and outlet passages; a bonnet removably secured to said body, said bonnet having an internally threaded portion; a valve stem reciprocably received in an aperture in said bonnet and having a threaded portion at its upper end; a valve gate mounted on the lower end of said stem for movement axially of said flow passages under the influence of fluid flow from said inlet passage whereby said gate in closed position is urged into sealing contact with the one of said sealing rings surrounding said outlet passage; a valve stem operator having external and internal threads of opposite hands adapted, respectively, to engage the threads on said bonnet and said stem whereby upon rotation of said operator said stem and said gate will be moved into or out of engagement with said sealing rings at a rate determined by the sum of the pitches of said external and internal threads on said operator.

12. A composite resilient valve seat insert for a gate valve comprising a pair of spaced resilient seal ring portions adapted to surround the valve flow passages, the inner and outer radial faces of each ring portion being adapted to sealingly engage the valve gate and the valve body, respectively, metal reinforcing rings bonded to the inner periphery of the respective resilient sealing ring portions, the width of the reinforcing ring at any circumferential point thereon being less than the width of the surrounding resilient sealing ring portion at said point, a resilient bridge formed integrally with said sealing ring portions and joining said sealing ring portions only around the lower portion of their periphery, said bridge having an upwardly facing abutment surface disposed radially outwardly of the inner periphery of said reinforcing rings, and metallic retainers projecting outwardly from each of said reinforcing rings and engageable with portions of the valve body structure to retain said insert against movement within said valve body.

13. For use in a gate valve, a seat insert assembly having a flowway therethrough and an opening therein intersecting the flowway for receiving a gate in flowway closing position, said assembly including rigid reinforcing portions forming said flowway on opposite sides of the opening, and a body of resilient material surrounding said rigid reinforcing portions and extending across said opening to abut the end of the gate when in flowway closing position, and an outwardly projecting stem of rigid material having a base portion extending laterally thereof opposite the opening to distribute the forces on the stem to a large area of the body of resilient material and reinforce the portion of said body which abuts the end of the gate.

14. A composite valve seat insert for a gate valve having inlet and outlet flow passages and a flow controlling gate comprising; a pair of spaced coaxial resilient sealing rings adapted to surround said passages and having surfaces engageable with the opposite sides of said gate; a resilient bridge integrally connecting said rings along a portion only of the circumference of said rings, said bridge having a surface for sealingly engaging the bottom of said gate when the latter is in closed position; a rigid reinforcing ring received within each of the sealing rings, and a rigid reinforcing shell on the outer surface of said bridge, said reinforcing rings and shell being attached to the sealing rings and bridge.

15. For use in a gate valve, a seat insert assembly having a flowway therethrough and an opening intersecting the flowway for receiving a gate in flowway closing position, said assembly including rigid reinforcing portions forming said flowway on opposite sides of the opening, a resilient portion surrounding said reinforcing portions and extending across said opening to abut the end of the gate when in flowway closing position, an additional rigid reinforcing portion attached to the resilient portion opposite the opening and extending continuously in a direction longitudinally of the flowway and substantially across said opening longitudinally of the flowway.

16. A composite valve seat insert for a valve having a central cavity communicating with inlet and outlet passages and a flow controlling gate comprising; a resilient body adapted to fit within said cavity, said body having a bridge and spaced coaxial sealing ring portions integrally connected by said bridge and adapted to surround said inlet and outlet passages, respectively, and providing laterally projecting sealing surfaces adapted to engage the respective upstream and downstream side surfaces of said gate; rigid annular reinforcing rings received within said sealing ring portions and secured to the inner periphery thereof, the inner periphery of said reinforcing rings forming a continuation of said inlet and outlet passages, and a rigid member secured to said body beneath said rings and adapted to engage a wall of said cavity.

17. A composite valve seat insert for a gate valve having inlet and outlet flow passages and a flow controlling gate comprising; a pair of spaced coaxial resilient sealing rings adapted to surround said passages and having laterally projecting surfaces engageable with the opposite sides of said gate; a resilient bridge integrally connecting said rings along a portion only of the circumference of said rings, said bridge having a surface for yieldingly engaging the bottom of said gate when the latter is in closed position; a rigid reinforcing ring received within each of said sealing rings and secured to the inner periphery thereof, and a rigid member secured to an outer surface of said bridge.

18. A gate valve comprising a valve body having inlet and outlet flow passages communicating at their inner ends with an enlarged upwardly opening cavity, said body having opposed surfaces surrounding said passages at the inner ends thereof, a bonnet detachably secured to said body to close said cavity, a stem mounted for reciprocating movement in said body, a gate mounted on the lower end of said stem for movement into and out of said cavity and for movement axially of said flow passages, a resilient insert adapted to be removably mounted in said cavity comprising a pair of spaced sealing ring portions surrounding the respective inner ends of said flow passages and having sealing surfaces adapted to engage said opposed body surfaces and additional sealing surfaces engageable with the side surfaces of said gate, the free width of said sealing ring portions between said sealing surfaces at any circumferential point thereon being greater than the space between the side surfaces of said gate and the adjacent body surfaces at said circumferential point, a resilient bridge integrally joining said ring portions along only their lower circumferential portions, said bridge having an upwardly facing surface engageable with the bottom edge of said gate, metal reinforcing rings secured to the inner periphery of each of said sealing ring portions, said reinforcing rings having radial surfaces engageable with the side surfaces of said gate whereby when said gate is moved to closed position its bottom edge engages said upwardly facing surface on said bridge and said gate is moved in a downstream direction by line pressure against the adjacent one of the reinforcing rings and the sealing ring portion at the downstream side of said gate is further compressed between the adjacent body and gate surfaces.

19. The gate valve according to claim 18 together with metallic retainers rigid with said metal reinforcing rings and projecting outwardly beyond said sealing ring portions and engageable with said body to prevent movement of said insert with respect to said cavity when said gate is in closed position.

20. A gate valve comprising a valve body having inlet and outlet flow passages communicating at their inner ends with an enlarged cavity having an enlarged opening extending laterally of said passages, the inner ends of said passages being formed by radially extending body surfaces surrounding said passages; a bonnet detachably secured to said body to close said opening in said cavity; a stem mounted for reciprocating movement coaxially of said opening; a gate mounted on the lower end of said stem for movement into and out of registry with said passages and for movement axially of said passages; a resilient insert adapted to be inserted in and removed from said cavity through said opening comprising a pair of spaced sealing ring portions surrounding the respective inner ends of said flow passages and having sealing surfaces adapted to engage said radially extending body surfaces and additional sealing surfaces engageable with the side surfaces of said gate, the free width of said sealing ring portions between said sealing surfaces being greater than the space between the side surfaces of said gate and the adjacent radially extending body surfaces; a resilient bridge integrally joining said ring portions along their lower circumferential portions, said bridge having an upwardly facing surface engageable with the bottom edge of said gate when said gate is in closed position; a reinforcing member secured to said bridge and engageable with a wall of said cavity; metal reinforcing rings secured to the inner periphery of each of said sealing rings, said reinforcing rings having outer radial surfaces engageable with said radially extending body surfaces and having inner radial surfaces engageable with the respective upstream and downstream side surfaces of said gate whereby when said gate is moved to closed position its bottom edge engages said upwardly facing surface on said bridge and said gate is moved in a downstream direction by line pressure against the adjacent one of said reinforcing rings and the sealing ring portion at the downstream side of said gate is further compressed between the adjacent body and gate surfaces.

21. The gate valve according to claim 20 together with retainers rigid with said reinforcing rings and projecting outwardly beyond said sealing ring portions.

22. A gate valve comprising a valve body structure having aligned inlet and outlet flow passages forming a permanent part thereof, said flow passages terminating at their inner ends in parallel annular flat surfaces extending radially outward from said flow passages, said body having a lateral opening intersecting said flow passages to form an enlarged cavity within said body between said flow surfaces, the portion of said cavity below the axis of said flow passage having an arcuate peripheral surface intersecting said flat surfaces to form with said flat surfaces an upwardly open essentially semi-cylindrical region in said cavity coaxially of said flow passages, said cavity region terminating at its upper end not substantially above the axis of said flow passages; a composite sealing insert assembly comprising a unitary resilient body having a passageway therethrough and a lateral opening therein intersecting the passageway intermediate its ends, said passageway being formed by a pair of spaced coaxial resilient annular sealing portions having outer sealing surfaces extending entirely around said flow passages and a rigid reinforcing ring positioned within each annular sealing portion to form the inner periphery of said passageway, said insert assembly including said rings being bodily movable through said opening into said cavity region with its passageway forming a continuation of said inlet and outlet flow passages and its opening extending in the same direction as said opening in said body, and said reinforcing rings being disposed in alignment with said flow passages with the outer flat radial surfaces of said reinforcing rings being disposed against said flat body surfaces, said insert having an arcuate outer peripheral surface, the lower portion of which engages said arcuate surface of said cavity region, said peripheral surface of said insert being out of contact with said arcuate wall of said cavity region above the axis of said flow passages; a bonnet removably connectable to the body across the opening therein to close said cavity; and a gate supported by the bonnet for movement through the opening in said seat assembly for opening and closing the passageway therethrough, said insert assembly including a resilient portion opposite the opening therein for abutting the lower end of the gate when said gate is moved to closed position, said gate being supported against lateral movement by said reinforcing rings.

23. The gate valve according to claim 18 together with cooperating means on said bridge and said valve body for preventing rotary shifting movement of said insert with respect to said valve body about the axis of said flow passages.

24. The gate valve according to claim 18 together with a reinforcing member secured to the bottom surface of said bridge.

References Cited in the file of this patent

UNITED STATES PATENTS

| | | |
|---|---|---|
| 2,194,262 | Allen et al. | Mar. 19, 1940 |
| 2,216,292 | Eveleth | Oct. 1, 1940 |
| 2,329,315 | Allen | Sept. 14, 1943 |
| 2,401,123 | Volpin | May 28, 1946 |
| 2,457,492 | Raybould | Dec. 28, 1948 |
| 2,519,541 | Bryant | Aug. 22, 1950 |
| 2,582,877 | Mekler | Jan. 15, 1952 |
| 2,606,740 | Allen | Aug. 12, 1952 |
| 2,622,840 | Cooke | Dec. 23, 1952 |
| 2,636,713 | Hamer | Apr. 28, 1953 |
| 2,731,231 | Garrott | Jan. 17, 1956 |
| 2,765,143 | Best | Oct. 2, 1956 |
| 2,784,934 | Paulius | Mar. 12, 1957 |

FOREIGN PATENTS

| | | |
|---|---|---|
| 165,457 | Austria | Mar. 10, 1950 |
| 1,132,374 | France | Nov. 5, 1956 |